(12) United States Patent
Tocchio et al.

(10) Patent No.: US 10,809,280 B2
(45) Date of Patent: Oct. 20, 2020

(54) FM INERTIAL SENSOR AND METHOD FOR OPERATING THE FM INERTIAL SENSOR

(71) Applicant: STMicroelectronics S.r.l., Agrate Brianza (IT)

(72) Inventors: Alessandro Tocchio, Milan (IT); Francesco Rizzini, Cornaredo (IT); Carlo Valzasina, Gessate (IT); Giacomo Langfelder, Milan (IT); Cristiano Rocco Marra, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 237 days.

(21) Appl. No.: 16/116,467

(22) Filed: Aug. 29, 2018

(65) Prior Publication Data

US 2019/0064205 A1 Feb. 28, 2019

(30) Foreign Application Priority Data

Aug. 30, 2017 (IT) .......................... 102017000097531

(51) Int. Cl.
*G01P 15/125* (2006.01)
*G01C 19/5719* (2012.01)
(Continued)

(52) U.S. Cl.
CPC ........ *G01P 15/125* (2013.01); *G01C 19/5719* (2013.01); *G01P 15/0802* (2013.01);
(Continued)

(58) Field of Classification Search
CPC ...... G01P 15/125; G01P 15/18; G01P 15/097; G01P 15/0802; G01C 19/5719
See application file for complete search history.

(56) References Cited

U.S. PATENT DOCUMENTS

2005/0150297 A1 7/2005 Ayazi et al.
2008/0236280 A1* 10/2008 Johnson ............. G01C 19/5726
73/504.14
2015/0355217 A1 12/2015 Ullrich et al.

FOREIGN PATENT DOCUMENTS

CN 101792109 A 8/2010
CN 103760382 A 4/2014
(Continued)

OTHER PUBLICATIONS

Lemkin et al., "A Three-Axis Micromachined Accelerometer with a CMOS Position-Sense Interface and Digital Offset-Trim Electronics," *IEEE Journal of Solid-State Circuits* 34(4):456-467, Apr. 1999.

*Primary Examiner* — David Z Huang
(74) *Attorney, Agent, or Firm* — Seed Intellectual Property Law Group LLP (57) ABSTRACT

An inertial sensor for sensing an external acceleration includes: a first and a second proof mass; a first and a second capacitor formed between first and second fixed electrodes and the first proof mass; a third and a fourth capacitor formed between third and fourth fixed electrodes and the second proof mass; a driving assembly configured to cause an antiphase oscillation of the first and second proof masses; a biasing circuit configured to bias the first and third capacitors, thus generating first variation of the oscillation frequency in a first time interval, and to bias the second and fourth capacitors, thus generating first variation of the oscillation frequency in a second time interval; a sensing assembly, configured to generate an differential output signal which is a function of a difference between a value of the oscillating frequency during the first time interval and a value of the oscillating frequency during the second time interval. Such differential output signal can be correlated to the value and direction of the external acceleration.

24 Claims, 8 Drawing Sheets

(51) Int. Cl.
    *G01P 15/08*         (2006.01)
    *G01P 15/18*         (2013.01)
    *G01P 15/097*      (2006.01)

(52) U.S. Cl.
    CPC ............ *G01P 15/097* (2013.01); *G01P 15/18* (2013.01); *G01P 2015/0808* (2013.01); *G01P 2015/0882* (2013.01)

(56) References Cited

FOREIGN PATENT DOCUMENTS

| | | | |
|---|---|---|---|
| CN | 103901227 | A | 7/2014 |
| CN | 105137120 | A | 12/2015 |
| CN | 106931957 | A | 7/2017 |
| CN | 106932609 | A | 7/2017 |
| WO | 98/37380 | A1 | 8/1998 |
| WO | 2015/097435 | A1 | 7/2015 |

\* cited by examiner

FM INERTIAL SENSOR AND METHOD FOR OPERATING THE FM INERTIAL SENSOR

BACKGROUND

Technical Field

The present disclosure relates to a frequency-modulation (FM) inertial sensor and to a method for operating the FM inertial sensor. In particular, the inertial sensor is an accelerometer.

Description of the Related Art

MEMS accelerometers are well known in the literature and they are used in many different applications (e.g., pedestrian navigation, head motion tracking, ESP automotive systems, etc.). This kind of devices suffers from thermal drift issues, that hinder the fabrication of inertial sensors with high stability in many fields of interest To address this temperature sensitivity AM accelerometers that use post-compensation algorithms to stabilize bias and scale factor over dynamic temperature environment, have been proposed; however they require additional power consumption, added temperature sensors, as well as complementary calculation capacity.

An alternative approach to AM accelerometers which avoids the above limitations is the application of a Frequency Modulation (FM) principle to accelerometers, where induced external acceleration changes the resonant frequency of the device by modifying the total effective stiffness.

The working principle of a FM accelerometer relies on a resonant element that, in presence of an external acceleration, varies its resonant frequency; the output of the sensor can therefore be written as $f_{out}=f_0+\Delta f(a)$, where $f_0$ is the resonance frequency in rest condition (i.e., without the influence of an external acceleration), a is the external acceleration and $\Delta f(a)$ is a frequency variation caused by the external acceleration a. In this configuration, a drift in the device resonant frequency (e.g., caused by a temperature variation) directly causes a corresponding output drift. It is well known that the thermal drift of the resonant frequency of a MEMS resonator manufactured in silicon (e.g., polycrystalline) depends on the drift of the Young modulus of polysilicon (described by its temperature coefficient TCE=−60 ppm/K), as follows:

$$\frac{df_0}{dT} = f_0 \cdot \frac{TCE}{2} = f_0 \cdot \left(-30\frac{\text{ppm}}{\text{K}}\right)$$

Thus, called S the sensitivity of the device (expressed in Hz/g), the output drift corresponding to an external acceleration a=0 (zero g offset drift), expressed in g units, is:

$$\frac{\frac{df_0}{dT}}{S} = \frac{f_0}{S} \cdot \left(-30\frac{\text{ppm}}{\text{K}}\right)$$

A first way to compensate the thermal drift is the use of differential readout: the sensor is typically formed by two different resonators of the same type each of which, when subject to the same external acceleration, varies its resonance frequency of a same amount but opposite sign. In this way, by subtracting the frequency outputs of the two resonators, the sensitivity can be doubled and the $f_0$ contribution (and the associated thermal drift) considerably reduced.

Therefore, summarizing, the frequencies of the two different resonators may be expressed as $f_{out1}$ and $f_{out2}$:

$$f_{out1}=f_0+\Delta f(a)\ f_{out2}=f_0-\Delta f(a)$$

and the differential frequency output $f_{out}$ as:

$$f_{out}=(f_0+\Delta f(a))-(f_0-\Delta f(a))=2\Delta f(a)$$

However, unavoidable resonant frequency mismatches between the two different resonators (e.g., caused non-uniformities in etching process and residual stresses in the structure) may compromise or reduce the positive effects of the differential readout approach. In fact, in the previous formulas it was assumed that $f_{02}=f_{01}=f_0$; in real devices $f_{01}$ is different from $f_{02}$. Considering again an external acceleration a=0, the zero-G offset drift ("ZGO", output value in the absence of input acceleration) is a function of the mismatch between the resonant frequencies of the two resonating elements:

$$\frac{\frac{\Delta f}{dT}}{S} = \frac{f_{02}-f_{01}}{S} \cdot \left(-30\frac{\text{ppm}}{\text{K}}\right)$$

BRIEF SUMMARY

In various embodiments, the present disclosure provides a frequency-modulation (FM) inertial sensor and a method for operating the FM inertial sensor which overcome the limitations of the known devices, as well as the issues previously illustrated.

According to the present disclosure, an inertial sensor and a method for operating the inertial sensor are provided. In one embodiment, the present disclosure provides an inertial sensor that includes a first proof mass that oscillates along a sensing axis. First and second tuning electrodes and first and second capacitors are included in the inertial sensor. The first capacitor includes the first tuning electrode and the first proof mass, and the second capacitor includes the second tuning electrode and the first proof mass. The first and second capacitors have respective capacitances which undergo opposite variations in response to the oscillation of the first proof mass along the sensing axis. A second proof mass oscillates along the sensing axis, and third and fourth tuning electrodes and third and fourth capacitors are further included in the inertial sensor. The third capacitor includes the third tuning electrode and the second proof mass, and the fourth capacitor includes the fourth tuning electrode and the second proof mass. The third and fourth capacitors have respective capacitances which undergo opposite variations in response to the oscillation of the second proof mass along the sensing axis.

The inertial sensor further includes a driving assembly, a biasing circuit, and a sensing assembly. The driving assembly is coupled to the first and second proof masses, and is configured to cause an anti-phase oscillation of the first and second proof mass at a resonance frequency along the sensing axis.

The biasing circuit biases, in a first time interval, the first tuning electrode and the third tuning electrode to generate a first electrostatic field which causes a first variation of said resonance frequency. In a second time interval, the biasing circuit biases the second tuning electrode and the fourth tuning electrode to generate a second electrostatic field which causes a second variation of said resonance frequency.

The sensing assembly generates an output signal which is a function of a difference between a value of the resonance frequency during the first time interval and a value of the resonance frequency during the second time interval.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figures 1A, 1B:
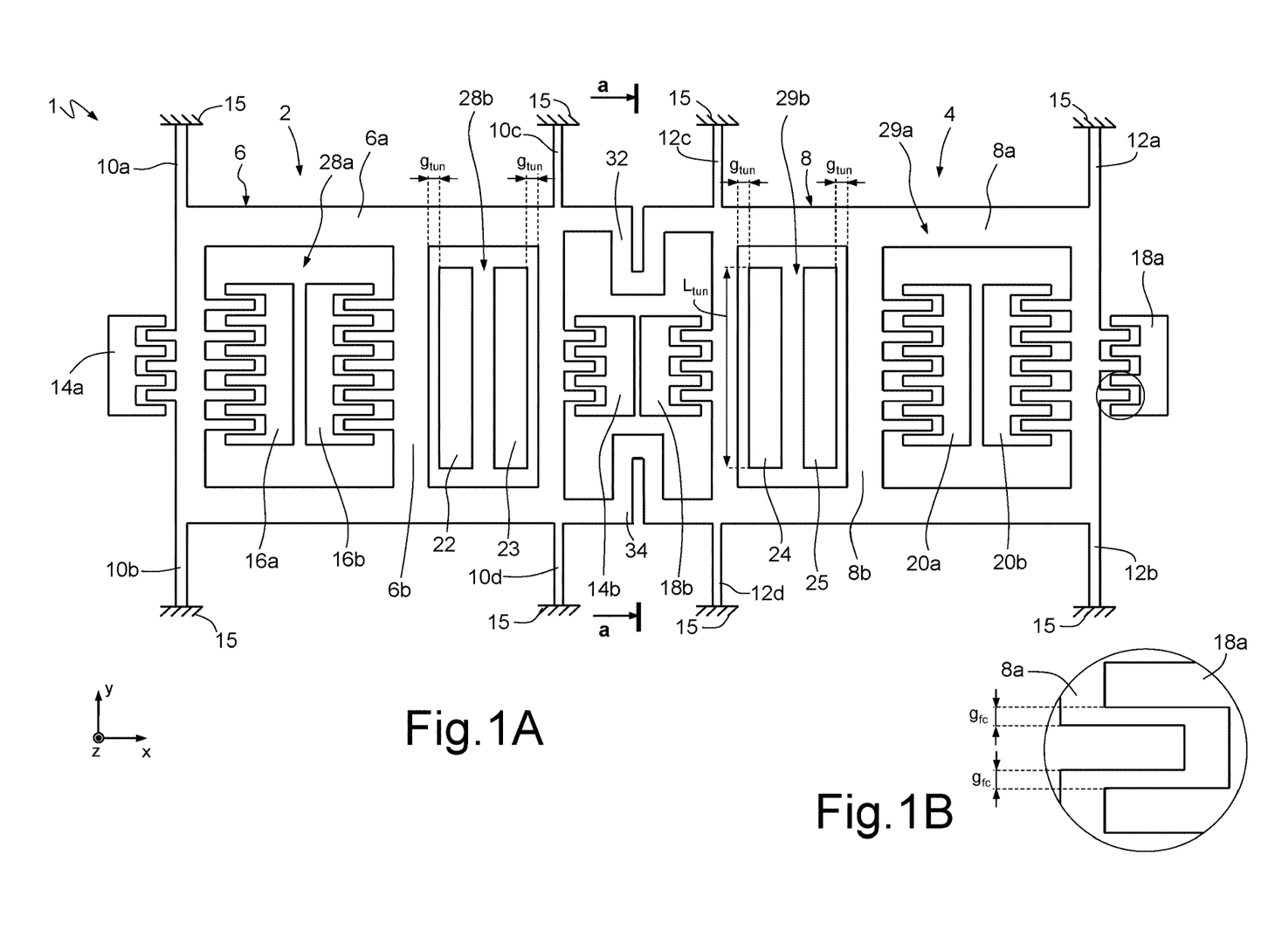
FIG. 1A shows a resonant sensor, in particular an accelerometer, according to an embodiment of the present disclosure.
FIG. 1B is an enlarged view of the circled portion in FIG. 1A.

FIG. 1A is a schematic representation of an inertial sensor, of resonating type, 1 according to an aspect of the present disclosure. In the following it will be referred to as resonator 1. The resonator 1 is shown in a top view, on a plane XY of a tri-axial reference system of orthogonal axis X, Y, Z.

The resonator 1 comprises a first and a second resonating structure 2, 4 each including a proof mass 6, 8. The resonator 1 has at least two vibration modes along the sensing axis: in-phase and anti-phase motion of the proof masses 6, 8. The proof mass 6 is mechanically coupled to a substrate 15 through a plurality (here, four) springs 10a-10d which allow oscillations of the proof mass 6 along the X axis, which is, in this exemplary embodiment, the sensing axis of the resonator 1. The proof mass 8 is mechanically coupled to the substrate 15 through a plurality (here, four) springs 12a-12d which allow oscillations along the X axis.

The first resonating structure 2 includes one or more driving electrodes (here, two driving electrodes 14a, 14b) and one or more sense electrodes (here, two sense electrodes 16a, 16b). The driving electrodes 14a, 14b and the sense electrodes 16a, 16b are, in this embodiment, in the form of comb fingers, capacitively coupled to respective comb fingers protruding from the proof mass 6. Other embodiments, not shown, may foresee an actuation through parallel plates, or a piezoelectric actuation. The main extension of all the fingers is along the X axis. The driving electrodes 14a, 14b are configured to cause, when biased, a movement of the proof mass 6 along the X axis.

The second resonating structure 4 analogously includes one or more driving electrodes (here, two driving electrodes 18a, 18b) and one or more sense electrodes (here, two sense electrodes 20a, 20b). The driving electrodes 18a, 18b and the sense electrodes 20a, 20b are in the form of comb fingers, operatively coupled to respective fingers protruding from the proof mass 8. The driving electrodes 18a, 18b are configured to cause, when biased, a movement of the proof mass 8 along the X axis.

The driving electrodes 14a, 14b, 18a, 18b are biased at the same time, in order to generate an anti-phase movement of proof masses 6, 8.

As shown in the enlarged view of FIG. 1B, which shows in greater details the circled portion of FIG. 1A, the distance between each finger of the driving electrode 18a and an adjacent finger protruding from the proof mass 8 is referenced to as $g_{cf}$. The same is valid for driving electrodes 14a, 14b and 18b, each of them having fingers distanced from adjacent finger protruding from the proof mass 6 or 8 equal to $g_{cf}$. The value of $g_{cf}$ is, e.g., in the range 1.5-2.5 µm.

The proof masses 6 and 8 form respective rotor electrodes of the first and second resonating structures 2 and 4. The first resonating structure 2 further includes two tuning electrodes (in the following, also referred to as stator electrodes) 22, 23; analogously, also the second resonating structure 4 further includes two tuning electrodes (stator electrodes) 24, 25. The tuning electrodes 22, 23 and 24, 25 are, according to the disclosed embodiment, in the form of parallel plates electrodes. The tuning electrodes 22-25 are capacitively coupled to the respective first and second resonating structures 2, 4 to which they belong. That is to say that the first resonating structure 2 forms a first parallel plate capacitor with the tuning electrode 22 and a second parallel plate capacitor with the tuning electrode 23; the second resonating structure 4 forms a third parallel plate capacitor with the tuning electrode 24 and a fourth parallel plate capacitor with the tuning electrode 25.

The proof mass 6 includes a frame 6a and is further provided with a separating wall 6b extending along the Y axis between opposite sides of the frame 6a and delimiting two hollow regions 28a, 28b. The hollow regions 28a, 28b are therefore surrounded by the frame 6a. The sense electrodes 16a, 16b extend within the hollow region 28a, while the tuning electrodes 22, 23 extend within the hollow region 28b. The tuning electrodes 22, 23 have an elongated shape (e.g., substantially rectangular in a top view with main side along Y axis) and are arranged one next to the other between the separating wall 6b and a lateral side of the frame 6a parallel to the separating wall 6b. The tuning electrodes 22 extends at a distance $g_{tun}$ (measured in rest condition along the X axis) from the separating wall 6b; analogously the tuning electrodes 23 extend at a same distance $g_{tun}$ (measured in rest condition along the X axis) from a lateral side of the frame 6a, and at a distance from one another. One or more anchoring points or vias are formed below each tuning electrode 22, 23, in such a way that the tuning electrode 22, 23 are fixed to the substrate below and not subject to the external acceleration. The same anchoring points or vias may be used for polarizing the tuning electrodes 22, 23. Other polarization means may be used.

The proof mass 8 includes a frame 8a and is further provided with a separating wall 8b extending along the Y axis between opposite sides of the frame 8a and delimiting two hollow regions 29a, 29b. The hollow regions 29a, 29b are therefore surrounded by the frame 8a. The sense electrodes 20a, 20b extend within the hollow region 29a, while the tuning electrodes 24, 25 extend within the hollow region 29b. The tuning electrodes 24, 25 have an elongated shape (e.g., substantially rectangular in a top view) and are arranged one next to the other between the separating wall 8b and a lateral side of the frame 8a parallel to the separating wall 8b. The tuning electrodes 24, 25 extend at a distance from the separating wall 8b and a lateral side of the frame 8a, and at a distance from one another. One or more anchoring points or vias are formed below each tuning electrode 24, 25, in such a way that the tuning electrode 22, 23 are fixed to the substrate below. The same clamps may be used for polarizing the tuning electrodes 24, 25. Other polarization means may be used.

The proof masses 6 and 8 are mechanically connected to one another through a tuning fork, here implemented with a first and a second connecting spring 32, 34, e.g., having each a serpentine-like shape. The first and the second connecting springs 32, 34 allow a relative displacement of the proof masses 6, 8 during anti-phase vibration mode (i.e., when proof masses 6, 8 oscillate along the X axis in opposite directions).

The first and second resonating structures 2, 4 are kept in oscillation at their anti-phase resonant frequency (i.e., the proof masses oscillate along the same X axis with opposite directions), by conveniently biasing the set of comb fingers capacitors implemented by the driving electrodes 14a, 14b and 18a, 18b, in a per se known way.

As it can be noted from FIG. 1A, the first and second resonating structures 2 and 4 are perfectly symmetric with respect to a symmetry axis a-a parallel to Y axis and passing through the tuning fork. In the anti-phase oscillation, when the proof mass 6 moves towards the negative direction of X axis (i.e., away from symmetry axis a-a), proof mass 8 moves towards the positive direction of X axis (i.e., away from symmetry axis a-a); on the contrary, analogously, when the proof mass 6 moves towards the positive direction of X axis (i.e., towards the symmetry axis a-a), proof mass 8 moves towards the negative direction of X axis (i.e., towards the symmetry axis a-a).

When the tuning electrodes 22-25 are properly polarized (i.e., a voltage difference exists between the tuning electrodes 22-25 and the proof masses 6, 8) the anti-phase stiffness of the first and the second resonating structure 2, 4 varies due to the electrostatic effect (in a per se known way), and consequently the anti-phase resonant frequency of the resonator 1 varies as well.

When an external acceleration $a_{ext}$ causes an in-phase displacement of both proof masses 6 and 8, the gaps between the proof mass 6 and the tuning electrodes 22, 23, as well as the gaps between the proof mass 8 and the tuning electrodes 24, 25 are subject to a variation which reflects the external acceleration $a_{ext}$. Depending on the direction of acceleration and on the combination of the bias applied to the tuning electrodes 22, 23, 24, 25, the resonance frequency of the resonator 1, undergo a different variation caused by a different electrostatic influence exerted by the tuning electrodes which are closer to the respective proof mass with respect to those which are farer to the respective proof mass.

More in particular, it is to be noted that the biasing of the tuning electrodes 22-25 is based on a time-division scheme. In a first tuning time interval, the first tuning electrode 22 and the third tuning electrode 24 are biased to generate a voltage difference $V_{tun}$ between the first tuning electrode 22 and the proof mass 6 and a same voltage difference $V_{tun}$ between the third tuning electrode 24 and the proof mass 8. The proof masses 6, 8 are for example at fixed voltage $V_{DC}$ (e.g., $V_{DC}$≈10V and $V_{tun}$≈7V). During this time interval, the presence of an external acceleration that causes a common mode movement of the proof masses 6, 8 in the positive X direction, would cause smaller gaps between the tuning electrodes 22 and 24 and the masses 6 and 8 respectively, thus resulting in a decreased value of the anti-phase mode resonance frequency of the resonator 1 with respect to the rest position. Vice versa, an acceleration in the opposite direction would results larger gaps and thus in an increased anti-phase mode resonance frequency. In a second tuning time interval, the second tuning electrode 23 and the fourth tuning electrode 25 are biased to generate the voltage difference $V_{tun}$ between the second tuning electrode 23 and the first proof mass 6 and the voltage difference $V_{tun}$ between the fourth tuning electrode 25 and the second proof mass 8; while the first and the third tuning electrodes 22 and 24 are biased in order to null the voltage differences with the proof masses 6, 8 kept at fixed voltage $V_{DC}$. In absence of an external acceleration $a_{ext}$ along the X axis, the frequency variation of the resonator 1 during the first and the second time intervals is the same. In presence of an in-phase displacement of the proof masses 6, 8 caused by an external acceleration $a_{ext}$ along the X axis, the resonator 1 is subject to a frequency variation of opposite sign during the first and the second time intervals.

This phenomenon is caused by the fact that the anti-phase oscillating frequency is highly affected by the value of the gaps $g_{tun}$. Since the external acceleration $a_{ext}$ causes a prolonged in-phase displacement of the proof masses 6, 8 along the X axis, the prolonged reduction/increment of the gaps $g_{tun}$ impacts on the value of the anti-phase oscillating frequency. This phenomenon is discussed in detail later on.

By providing a sensing circuit of a differential type, coupled to the sense electrodes 16a, 16b, 20a, 20b, an output signal is generated as a difference between a value of the resonance frequency acquired during the first tuning time interval and a value of the resonance frequency value acquired during the second tuning time interval immediately following, in time, the first tuning time interval (or vice versa). This output signal is proportional to the external acceleration $a_{ext}$ to be measured. The frequency of the external acceleration $a_{ext}$ to be measured should be lower than the switching frequency between the first and the second tuning time intervals.

Figure 2:
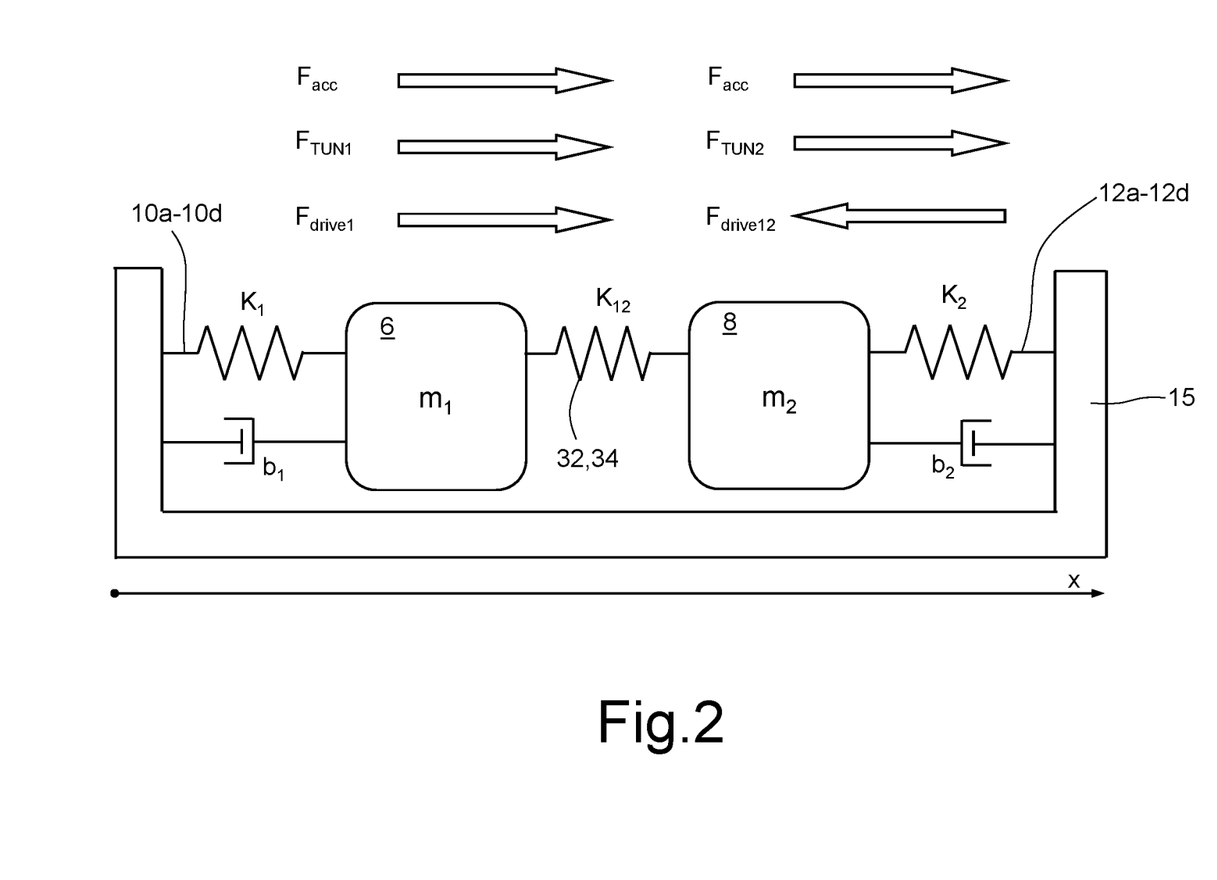
FIG. 2 shows a double mass-spring-damper model of the resonator of FIG. 1A.

FIG. 2 shows a double mass-spring-damper model of the resonator 1 of FIG. 1A. The proof mass 6 is represented as a first mass m1, the proof mass 8 is represented as second mass m2, and the first 32 and second 34 connecting springs (tuning fork) are represented together as one spring having a stiffness $k_{12}$. Furthermore, in this model, $k_1$ and $k_2$ are the stiffness of the respective elastic elements 10a-10d and 12a-12d that connect the two proof masses 6, 8 to the substrate 15. The damping coefficient associated to the respective mass m1 and m2 is indicated with b1 and b2 (in the following, b1=b2=b), while the cross-damping coefficient has been neglected in this model. Moreover, the displacement is considered positive when directed along X toward the positive direction of X; further forces acting on the system are represented with arrows, and described in the following.

In a working condition, the following three forces act on each mass m1, m2: $F_{acc}$, the inertial force due the external acceleration $a_{ext}$ (common to both masses m1, m2); $F_{drive1}$ and $F_{drive2}$, the driving forces applied by the comb fingers electrodes 14a-14b and 18a-18b to the respective proof masses 6, 8; $F_{tun1}$ and $F_{tun2}$, the forces exerted by the tuning electrodes 22, 23 and 24, 25 on the respective proof masses 6, 8 in the first and second tuning time intervals previously discussed.

Forces $F_{tun1}$ and $F_{tun2}$ are the electrostatic forces acting on the proof masses 6, 8 and depend on the voltage at which the tuning electrodes 22-25 are biased with respect to the proof masses 6, 8, as detailed in the following equations.

Keeping the above forces into account, one can write the equation of motion for each mass m1 and m2:

$$\begin{cases} m_1 \ddot{x}_1 = -k_1 x_1 + k_{12}(x_2 - x_1) - b\dot{x}_1 + F_{tun1} + F_{acc} + F_{drive1} \\ m_2 \ddot{x}_2 = -k_2 x_2 - k_{12}(x_2 - x_1) - b\dot{x}_2 + F_{tun2} + F_{acc} - F_{drive2} \end{cases} \quad (1)$$

where x1 and x2 are the displacements, along X axis, of the masses m1 and, respectively, m2 with respect to the rest condition.

It is here noted that according to the present disclosure the resonator 1 is controlled, during use, in anti-phase vibration (at the resonance frequency), while the external acceleration excites the in-phase vibration mode. A typical acceleration has a frequency which is lower than the in-phase resonance frequency and will cause a displacement given by $x_{ph} = (1/w_{0ph})^2 \cdot a_{ext}$, where $w_{0ph}$ is the in-phase resonance frequency.

The in-phase $x_{ph}$ and anti-phase $x_{aph}$ displacements can be defined as follows:

$$\begin{cases} x_{ph} = \dfrac{x_1 + x_2}{2} \\ x_{aph} = \dfrac{x_1 - x_2}{2} \end{cases} \quad (2)$$

Equation (2) can be substituted into equation (1), considering also that, in the embodiment discussed, m1=m2=m and $k_1=k_2=k$, thus obtaining:

$$\begin{cases} m(\ddot{x}_{ph} + \ddot{x}_{aph}) = -k(x_{ph} + x_{aph}) + k_{12}(-2x_{aph}) - \\ \quad b(\dot{x}_{ph} + \dot{x}_{aph}) + F_{tun1} + F_{acc} + F_{drive1} \\ m(\ddot{x}_{ph} + \ddot{x}_{aph}) = -k(x_{ph} - x_{aph}) - k_{12}(-2x_{aph}) - \\ \quad b(\dot{x}_{ph} - \dot{x}_{aph}) + F_{tun2} + F_{acc} - F_{drive2} \end{cases} \quad (3)$$

Rearranging the equations in (3), a more convenient form can be obtained:

$$\begin{cases} m(\ddot{x}_{ph}) = -k(x_{ph}) - b(\dot{x}_{ph}) + F_{acc} + \dfrac{F_{tun1} + F_{tun2}}{2} \\ m(\ddot{x}_{aph}) = -(k + 2k_{12})(x_{aph}) - b(\dot{x}_{aph}) + F_{acc} + \\ \quad \dfrac{F_{tun1} - F_{tun2}}{2} + \dfrac{F_{drive1} + F_{drive2}}{2} \end{cases} \quad (4)$$

System of equations (4) can be analyzed in the Laplace domain, obtaining a second order force-displacement transfer function for each one of the in-phase and anti-phase mode. Hence, the natural resonant frequencies for in-phase and, respectively, anti-phase mode can be written as:

$$\begin{cases} \omega_{0,ph} = \sqrt{\dfrac{k}{m}} \\ \omega_{0,aph} = \sqrt{\dfrac{k + 2k_{12}}{m}} \end{cases} \quad (5)$$

In order to evaluate the device's sensitivity, it is useful to find out the relation between the change in the resonant frequency of the anti-phase mode and the external acceleration $a_{ext}$. The tuning of $f_0$ is determined by $F_{tun1}$ and $F_{tun2}$ in equation (4). The electrostatic force F(t) applied to the suspended mass depends on the voltage difference V(t) between the tuning electrodes and the proof masses, as follows:

$$F(t) = \frac{1}{2} \frac{\delta C}{\delta x} V^2(t) \quad (6)$$

where $\delta C/\delta x$ is the capacitance variation per unit of displacement of the movable masses along x.

In order to compute the effect of the tuning voltage applied on the tuning electrodes (stators) 22-25, the representation of FIG. 1A can be taken as a reference. Considering the stators 22, 23 (here, in the form of parallel plates electrodes), they are alternatively turned "on" (i.e., biased with a voltage difference with respect to the proof masses) and "off" (i.e., biased at the same voltage of the proof masses) at a frequency $f_{sw} = 1/T_{sw}$.

The following assumptions are made:

$V_{tun}$ is the voltage difference between the biasing voltage of the rotor 6 and the biasing voltage of the stator 22 or 23 (in the respective tuning time interval), the first tuning time interval, in which stator 22 is biased and stator 23 is unbiased, is $[0-T_{sw}/2]$, the second tuning time interval, in which the stator 23 is biased and stator 22 is unbiased is $[T_{sw}/2-T_{sw}]$.

From the above assumptions it follows that electrostatic force $F_{tun1}$ can be written as:

$$F_{tun1} = \begin{cases} -\dfrac{V_{tun}^2}{2} \cdot \dfrac{\epsilon_0 H L_{tun} N_{tun}}{(g_{tun} + x_1)^2} & t \in \left[0, \dfrac{T_{sw}}{2}\right] \\ +\dfrac{V_{tun}^2}{2} \cdot \dfrac{\epsilon_0 H L_{tun} N_{tun}}{(g_{tun} - x_1)^2} & t \in \left[\dfrac{T_{sw}}{2}, T_{sw}\right] \end{cases} \quad (7)$$

The above applies analogously to stators 24, 25, so that electrostatic force $F_{tun2}$ can be written as:

$$F_{tun2} = \begin{cases} -\dfrac{V_{tun}^2}{2} \cdot \dfrac{\epsilon_0 H L_{tun} N_{tun}}{(g_{tun} + x_2)^2} & t \in \left[0, \dfrac{T_{sw}}{2}\right] \\ +\dfrac{V_{tun}^2}{2} \cdot \dfrac{\epsilon_0 H L_{tun} N_{tun}}{(g_{tun} - x_2)^2} & t \in \left[\dfrac{T_{sw}}{2}, T_{sw}\right] \end{cases} \quad (8)$$

where $L_{tun}$ and $N_{tun}$ are respectively the length (along Y axis) and the number of the tuning electrodes (e.g., here $L_{tun}$ is about 400 μm and $N_{tun}$ is equal to 1); $\epsilon_0 = 8.854 \times 10^{-12}$ F·m$^{-1}$ is the vacuum permittivity; H is the process height, i.e., the thickness, along Z axis, of the resonating structures 2, 4 and tuning electrodes 22-25, supposing that the manufacturing process is such that all elements forming the resonator 1 have a same thickness and are realized through a common photolithographic process—for example H is in the range 20-30 µm; $g_{tun}$ is the smaller value of the gap between the rotor 6 and each stator 22, 23—or analogously, rotor 8 and stator 24, 25—in rest condition and is, e.g., about 2 µm.

Substituting $x_1$ with $x_{ph}+x_{aph}$ and $x_2$ with $x_{ph}-x_{aph}$, and linearizing for small values of $x_{aph}$ and $x_{ph}$ with respect to the gap $g_{tun}$ (e.g., considering $x_{aph}$ and $x_{ph}$ being one order of magnitude lower than the measure of the gap $g_{tun}$) it follows that:

$$\frac{F_{tun1} + F_{tun2}}{2} \cong \begin{cases} -\frac{V_{tun}^2}{2} \cdot \frac{\epsilon_0 H L_{tun} N_{tun}}{g_{tun}^2} \left(1 - \frac{2x_{ph}}{g_{tun}}\right) & t \in \left[0, \frac{T_{sw}}{2}\right] \\ +\frac{V_{tun}^2}{2} \cdot \frac{\epsilon_0 H L_{tun} N_{tun}}{g_{tun}^2} \left(1 + \frac{2x_{ph}}{g_{tun}}\right) & t \in \left[\frac{T_{sw}}{2}, T_{sw}\right] \end{cases} \quad (9)$$

$$\frac{F_{tun1} - F_{tun2}}{2} \cong \begin{cases} \frac{-V_{tun}^2}{2} \epsilon_0 H L_{tun} N_{tun} x_{aph} \left(1 - \frac{3x_{ph}}{g_{tun}}\right) & t \in \left[0, \frac{T_{sw}}{2}\right] \\ +\frac{V_{tun}^2}{2} \epsilon_0 H L_{tun} N_{tun} x_{aph} \left(1 + \frac{3x_{ph}}{g_{tun}}\right) & t \in \left[\frac{T_{sw}}{2}, T_{sw}\right] \end{cases}$$

It can be observed that the effect of the forces in equation (9) is equivalent to an electrostatic stiffness $k_{el}$ for the anti-phase mode:

$$k_{el}(t) = \begin{cases} \frac{-V_{tun}^2}{2} \epsilon_0 H L_{tun} N_{tun} \left(1 - \frac{3x_{ph}}{g_{tun}}\right) = & t \in \left[0, \frac{T_{sw}}{2}\right] \\ k_{el,0} - k_{el,0} \cdot \frac{3x_{ph}}{g_{tun}} \\ +\frac{V_{tun}^2}{2} \epsilon_0 H L_{tun} N_{tun} \left(1 + \frac{3x_{ph}}{g_{tun}}\right) = & t \in \left[\frac{T_{sw}}{2}, T_{sw}\right] \\ k_{el,0} + k_{el,0} \cdot \frac{3x_{ph}}{g_{tun}} \end{cases} \quad (10)$$

where $k_{el,0}$ is the electrostatic stiffness $k_{el}$ in the absence of external acceleration (i.e., with $x_{ph}=0$).

This electrostatic spring softening determines an anti-phase mode resonant frequency variation, described by:

$$\omega_{aph} = \sqrt{\frac{k + 2k_{12} - k_{el}(t)}{m}} \quad (11)$$

where $k_1=k_2=k$.

First of all, it can be noted that $k_{el}$ depends on the in-phase displacement $x_{ph}$ that, in turn, depends on external acceleration $a_{ext}$ with the well-known relation $$x_{ph} = \frac{1}{w_{0,ph}^2} \cdot a_{ext} \quad (12)$$

where $\omega_{0,ph}$ is given by equation (5).

The antiphase mode resonant frequency provides therefore an information about the external acceleration $a_{ext}$. Considering equation (10), it is noted that a factor (with opposite sign) is added to $k_{el,0}$ in the two temporal intervals $[0-T_{sw}/2]$ and $[T_{sw}/2-T_{sw}]$. This factor causes a frequency shift of opposite sign in the two temporal intervals, in presence of an external acceleration (i.e., with $x_{ph} \neq 0$). Consequently, a differential readout and an offset drift compensation is possible, as later described in detail.

Substituting equation (10) in equation (11), one obtains:

$$f_{aph} = \begin{cases} f_{aph,0} \cdot \left[1 - \frac{1}{2\pi} \frac{k_{el,0}}{2(k + 2k_{12})} \cdot \left(1 - \frac{3a_{ext}}{w_{0,ph}^2 g_{tun}}\right)\right] & t \in \left[0, \frac{T_{sw}}{2}\right] \\ f_{aph,0} \cdot \left[1 - \frac{1}{2\pi} \frac{k_{el,0}}{2(k + 2k_{12})} \cdot \left(1 + \frac{3a_{ext}}{w_{0,ph}^2 g_{tun}}\right)\right] & t \in \left[\frac{T_{sw}}{2}, T_{sw}\right] \end{cases} \quad (13)$$

where $f_{aph,0}$ refers to the anti-phase resonance frequency in rest condition, i.e., in the absence of external acceleration.

When a readout of differential type is employed for reading the resonance frequencies of the first and second proof masses 6, 8 (i.e., subtracting one frequency to the other), the expression of sensitivity (written in a convenient form) is readily obtained:

$$S = \qquad (14)$$
$$\frac{\Delta f}{a_{ext}} = \frac{3}{(2\pi)^2} \cdot \frac{k_{el,0}}{k_{ph}} \cdot \frac{1}{f_0} \cdot \frac{1}{g_{tun}} = \frac{3}{(2\pi)^2} \cdot \frac{V_{tun}^2 \epsilon_0 H L_{tun} N_{tun}}{k_{ph}} \cdot \frac{1}{f_0} \cdot \frac{1}{g_{tun}^4}$$

It is noted that the sensitivity grows with increasing area of tuning plates 22-25 and has a square dependence from $V_{tun}$. The sensitivity has a strong dependence from the gap $g_{tun}$. The sensitivity moreover is inversely proportional to $k_{ph}$.

Figure 3:
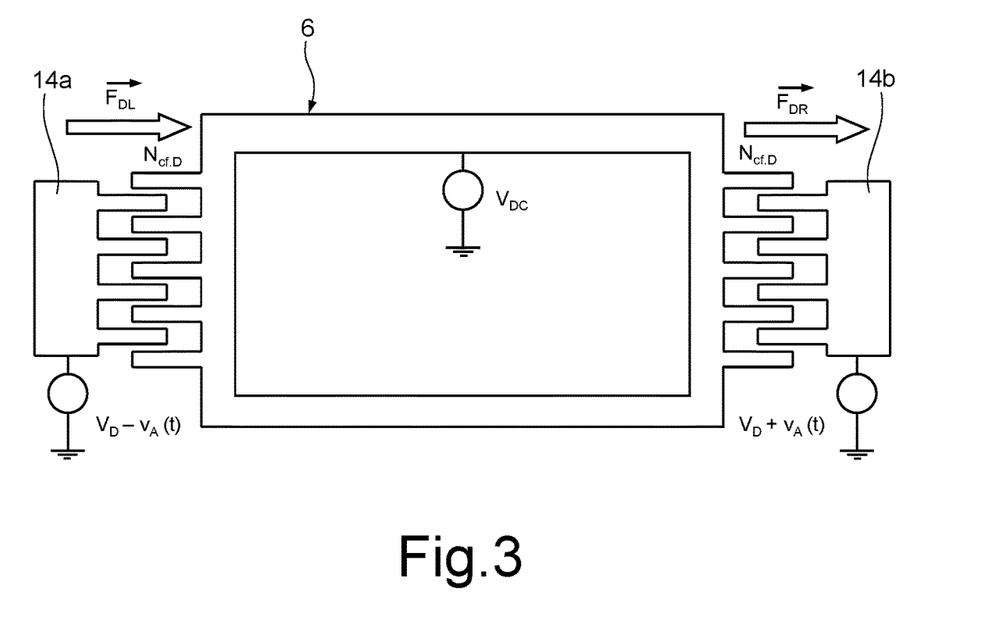
FIG. 3 represents a portion of a driving assembly of the resonant sensor of FIG. 1A.

FIG. 3 is a schematic representation of a portion of the driving part of the resonator of FIG. 1A (in particular, the driving part of the first resonating structure 2). The same applies to the driving part of the second resonating structure 4.

The driving force is generated by applying a voltage at the comb fingers electrodes 14a, 14b, to implement the so-called push-pull driving. To this end, opposite AC voltages $v_a(t)$ (superimposed on a same $V_D$ bias) are applied to driving electrodes 14a and, respectively, 14b which are arranged on opposite sides of the proof mass 6. The resulting driving forces $F_{DL}$, $F_{DR}$ have the same direction and sign, and the resulting modulus is:

$$F_D = F_{DL} + F_{DR} = -\frac{(V_{DC} - V_D - v_a(t))^2}{2} \cdot \frac{2\epsilon_0 H N_{c,f,D}}{g_{cf}} + \quad (15)$$
$$\frac{(V_{DC} - V_D + v_a(t))^2}{2} \cdot \frac{2\epsilon_0 H N_{c,f,D}}{g_{cf}}$$

$$F_D = \frac{2\epsilon_0 H N_{c,f,D}}{g_{cf}} 2(V_{DC} - V_D) v_a(t) = 2 \cdot \eta_d \cdot v_a(t)$$

where $N_{cf,D}$ is the number of driving electrodes fingers; $\eta_d$ is the drive transduction factor (proportionality coefficient between the drive voltage and the force applied to the structure).

The drive transduction factor $\eta_d$ associated with a single port (i.e., not considering the comb-fingers push-pull drive, nor the other proof mass 8), is as follows:

$$\eta_d = (V_{DC} - V_D) \cdot \left(\frac{2\epsilon_0 H N_{cf,S}}{g_{cf}}\right) \quad (16)$$

Figure 4:
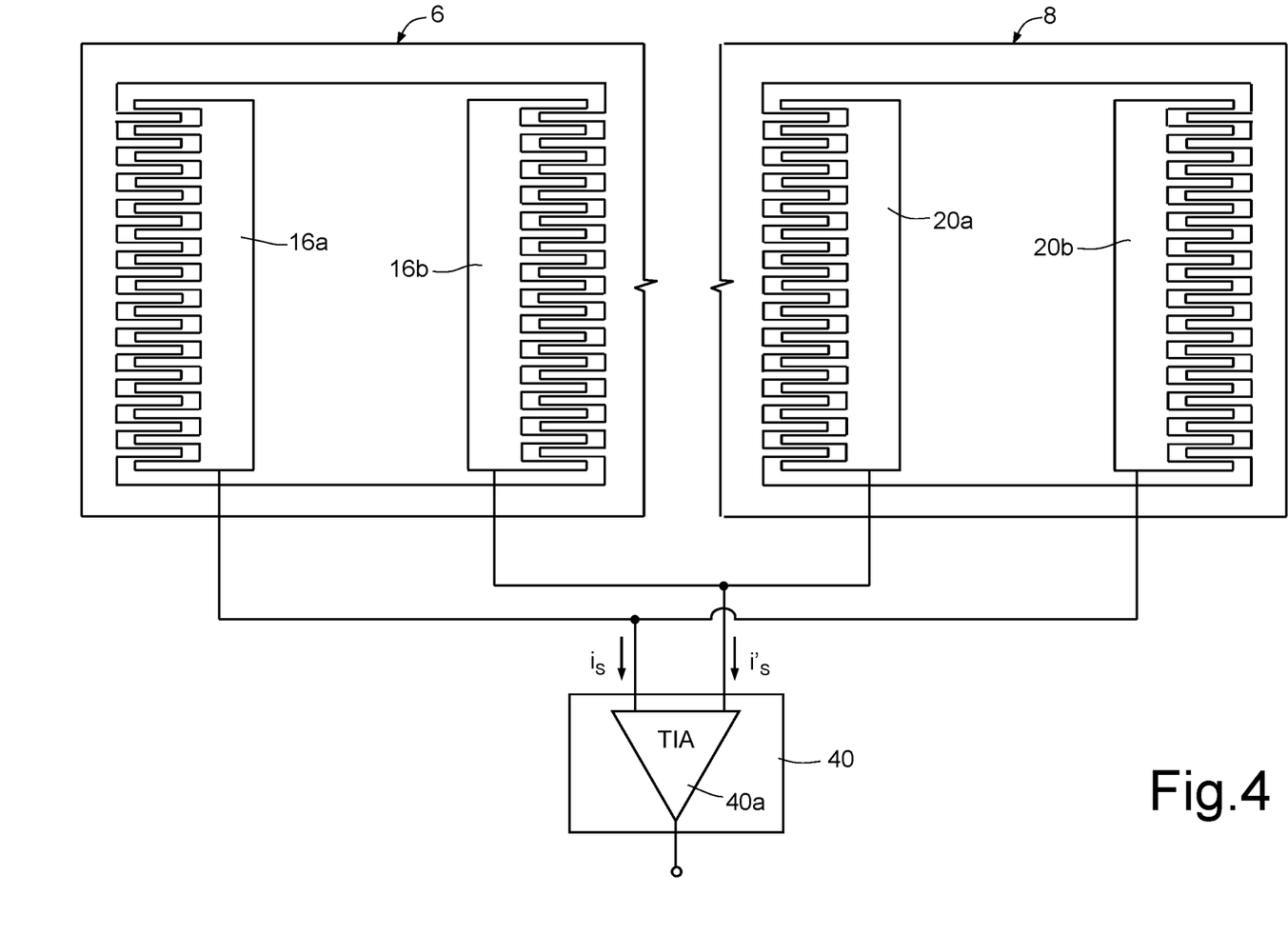
FIG. 4 represents a portion of a sensing assembly of the resonator of FIG. 1A.

As discussed with reference to FIG. 1A, the resonator 1 comprises sense electrodes 16a, 16b and 20a, 20b for sensing the displacement of proof mass 6 and, respectively, proof mass 8. These sense electrodes can be implemented in the form of comb fingers electrodes as shown in the figures or, according to a further embodiment (not shown) in the form of parallel plates. FIG. 4 is a schematic representation of a portion of the sensing part of the resonator of FIG. 1A (in particular, the sensing part of the first resonating structure 2) where the sense electrodes are designed as comb fingers. Same considerations apply to the sensing part of the second resonating structure 4.

With reference to FIG. 4, a differential readout configuration has been adopted for the sensing part. The following equation (17) shows that the motional current $i_s$ is proportional to the velocity of the proof mass considered:

$$i_s(t) = \frac{\delta Q(t)}{\delta t} = (V_{DC} - V_S) \cdot \frac{\delta C(t)}{\delta t} = \left[(V_{DC} - V_S)\frac{\delta C}{\delta x}\right] \cdot \dot{x}(t) = \eta_s \cdot \dot{x}(t) \quad (17)$$

where $V_{DC}$ is the polarization voltage of the proof mass and $V_S$ is the polarization voltage of sense electrodes; and $\eta_s$ is the proportionality coefficient between the velocity and the current flowing from a number $N_{cf,S}$ of comb fingers of the sense electrode (in other words, it is the current obtained considering only one branch of the differential readout and only one proof mass). Thus, the expression of $\eta_s$ can be written as:

$$\eta_s = V_{DC} \cdot \left(\frac{2\epsilon_0 H N_{cf,S}}{g_{cf}}\right) \quad (18)$$

where $g_{cf}$ is the gap (along Y axis) between fingers of the sensing electrodes 16a, 16b and 20a, 20b directly facing respective fingers of the rigid masses 6, 8 to which they are coupled (here $g_{cf}$ is analogous to, and has the same value of, the gap $g_{cf}$ described with reference to FIG. 1B and therefore it has been given the same name).

A capacitance-to-voltage converter block 40 includes, for example, a differential transimpedance amplifier (TIA) 40a.

During the operation of the device, the sense electrodes 16a, 20b, and in particular the capacitances between the fingers of the sense electrodes 16a, 20b and the fingers of the proof masses 6, 8, with which they are interdigitated, undergo a variation with a same sign both capacitances increase or both capacitances decrease (anti-phase oscillation). Two current signals, having a same sign and amplitude, are generated and summed to one another. A first common output electrical signal (current signal) $i_s$ is thus produced. At the same time, the capacitances between the fingers of the sense electrodes 16b, 20a and the fingers of the proof masses 6, 8, with which they are interdigitated, undergo an opposite variation (both capacitances decrease or both capacitances increase). Two current signals, having a same sign and amplitude, are generated and summed to one another. A second common output electrical signal (e.g., current signal) $i_s'$ is thus produced. The TIA 40a converts the difference $i_s - i_s'$ between the two common output electrical signals to a measurable voltage signal. By measuring the frequency of the TIA output voltage signal one can infer the value of the anti-phase mode resonance frequency and thus the value of the applied acceleration $a_{ext}$ through equation (14).

The driving and reading method of resonator 1 employs a differential readout of the antiphase resonance frequency of the resonator 1, implemented in the two tuning time intervals. In particular, according to an embodiment, the method can be summarized as outlined hereunder:

in a first step, the first and second resonating structures 2, 4 are driven in anti-phase with proper biasing of the driving stage 14a, 14b and 18a, 18b;

in a second step, maintaining the oscillation of the first and second resonating structures 2, 4 in anti-phase mode, one among the tuning electrodes 22, 23 (e.g., electrode 22) and one among the tuning electrodes 24, 25 (electrode 24) is biased at a voltage such that the $V_{tun}$ voltage difference is generated: this causes a resonant frequency variation of the resonator 1; if the resonator 1 is subject to an external acceleration which causes a displacement of the first and second resonating structures 2, 4 towards the electrodes 22, 24 and away from the electrodes 23, 25 (thus reducing the gap between the first and second resonating structures 2, 4 and the respective electrode 22, 24), the anti-phase resonant frequency of the first and second resonating structures 2, 4 drops (vice versa, the frequency would increase);

in a third step, maintaining the first and second resonating structures 2, 4 in anti-phase oscillation, the other among the tuning electrodes 22, 23 (here, electrode 23) and the other among the tuning electrodes 24, 25 (here, electrode 25) is biased at a voltage such that the $V_{tun}$ voltage difference is generated: this causes a resonant frequency variation of the first and second resonating structures 2, 4; if the resonator 1 is subject to the same external acceleration of the previous second step, this causes a displacement of the first and second resonating structures 2, 4 towards the non-biased electrodes 22, 24 and away from the biased electrodes 23, 25 (thus increasing the gap between the first and second resonating structures 2, 4 and the respective electrode 23, 25), and the anti-phase resonant frequency of the first and second resonating structures 2, 4 increases (vice versa, the frequency would drop);

in a fourth step, a simple correlation can be made between an increase or drop of the resonance frequency to obtain the direction and modulus of the external acceleration. In fact, a linear relation exists between the differential shift of the anti-phase frequency in the two temporal intervals: $\neq f = S \cdot a_{ext}$, where S is the sensitivity of equation (14).

Figure 5:
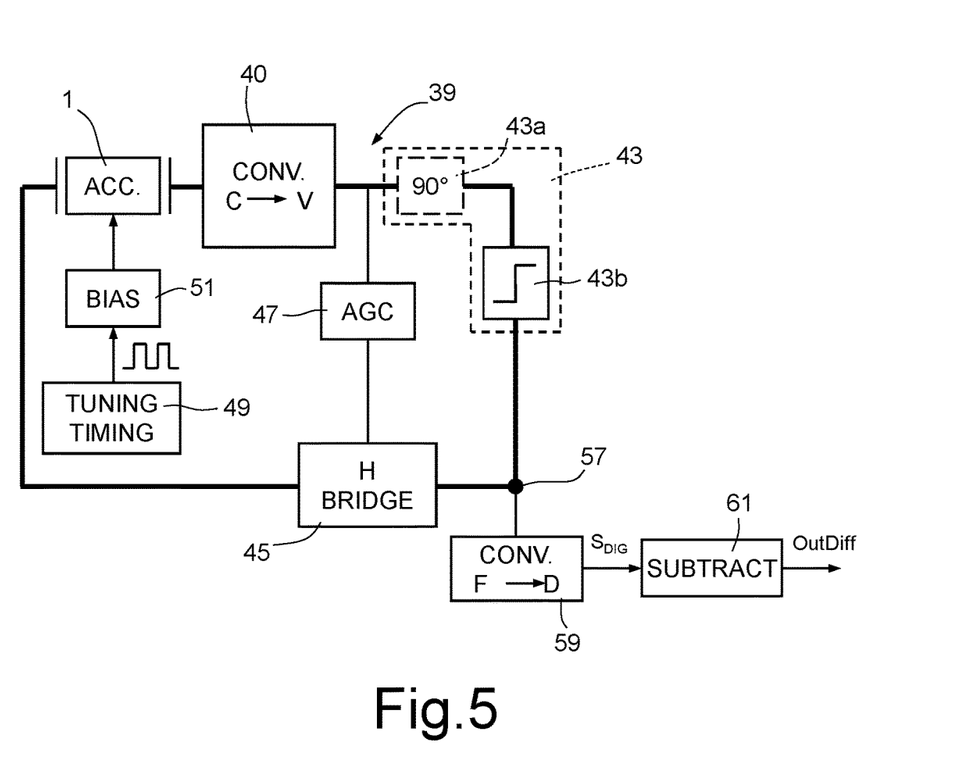
FIG. 5 shows a driving circuit to initiate and sustain the anti-phase oscillation of the resonator of FIG. 1A.

FIG. 5 shows a driving circuit 39 configured to initiate and sustain the anti-phase oscillation of the proof masses 6, 8 of the resonator 1. The driving circuit 39 includes: the capacitance-to-voltage converter 41, already described with reference to FIG. 4, coupled to the resonator 1; a gain-phase block 43, provided with a squaring circuit 43b, designed to receive the voltage signal generated by the capacitance-to-voltage converter 41 and generate a driving signal satisfying the Barkhausen's criterion for sustained oscillation; an H-bridge switching circuit 45, coupled between the gain-phase block 43 and the resonator 1, to receive the driving signal from the gain-phase block 43 and supply the resonator 1 with a square-wave signal having a frequency adapted to drive the proof masses in anti-phase oscillation; and an amplitude gain control block 47, coupled to the capacitance-to-voltage converter 41 and to the H-bridge switching circuit 45, to receive the voltage signal from the capacitance-to-voltage converter 41 and control the H-bridge switching circuit 45 to adjust the amplitude of the signal generated by the H-bridge switching circuit 45. The MEMS resonator discussed above has a push-pull drive structure, which involves supplying the drive electrodes with respective signals having a 180° shift in phase one with respect to the other. The amplitude of these signals may be regulated with an AGC to control the anti-phase movement. The signal from the comparator (and its negated) may be provided to a couple of inverters supplied with a tunable voltage $V_{CONT}$. In this way, the output will be formed by two square waves shifted of 180° one with respect to the other, with a $V_{CONT}$ amplitude.

The output of the H-bridge switching circuit 45 is supplied to the driving electrodes 14a, 14b, 18a, 18b, in a per se known way.

Applicant notes that, to satisfy the Barkhausen's criterion, along the ring, the total phase shift should be 360°, so that the oscillation is started and correctly maintained. When the readout is carried out with an inverting integrator which introduces a 270° phase shift, a further phase shifter element 43a is utilized to introduce further 90° shift. When the reading is carried out through a TIA amplifier, the phase shifter element 43a may be omitted.

A timing block 49 is coupled to the resonator 1 and is configured to generate a square wave signal with 50% duty cycle wherein, in each period, the duration of the maximum value of the square wave corresponds to the first time interval (when tuning electrodes 22, 24 are biased at a $V_{tun}$ voltage difference with respect to the proof masses 6, 8), and the duration of the minimum value of the square wave corresponds to the second time interval (when tuning electrodes 23, 25 are biased at a $V_{tun}$ voltage difference with respect to the proof masses 6, 8). A biasing block 51 receives the square wave thus generated and, during the first time interval, generates the biasing voltage for the tuning electrodes 22, 24; during the second time interval, it generates the biasing voltage for the tuning electrodes 23, 25.

As apparent from the above, the physical output of the converter 40 can be used to pick up the output signal of the resonator 1, i.e., the oscillating frequency of the proof masses 6 and 8. As already explained, by monitoring the oscillating frequency it is possible to obtain an indication of the external acceleration acting on the resonator 1, along the sensing axis (here, the X axis). Analogously, also a node 57 between the start-up block 43 and the H-bridge switching circuit 45 can be used as pick-up node for frequency monitoring (here, the signal is squared and therefore of a better quality).

Figure 6:
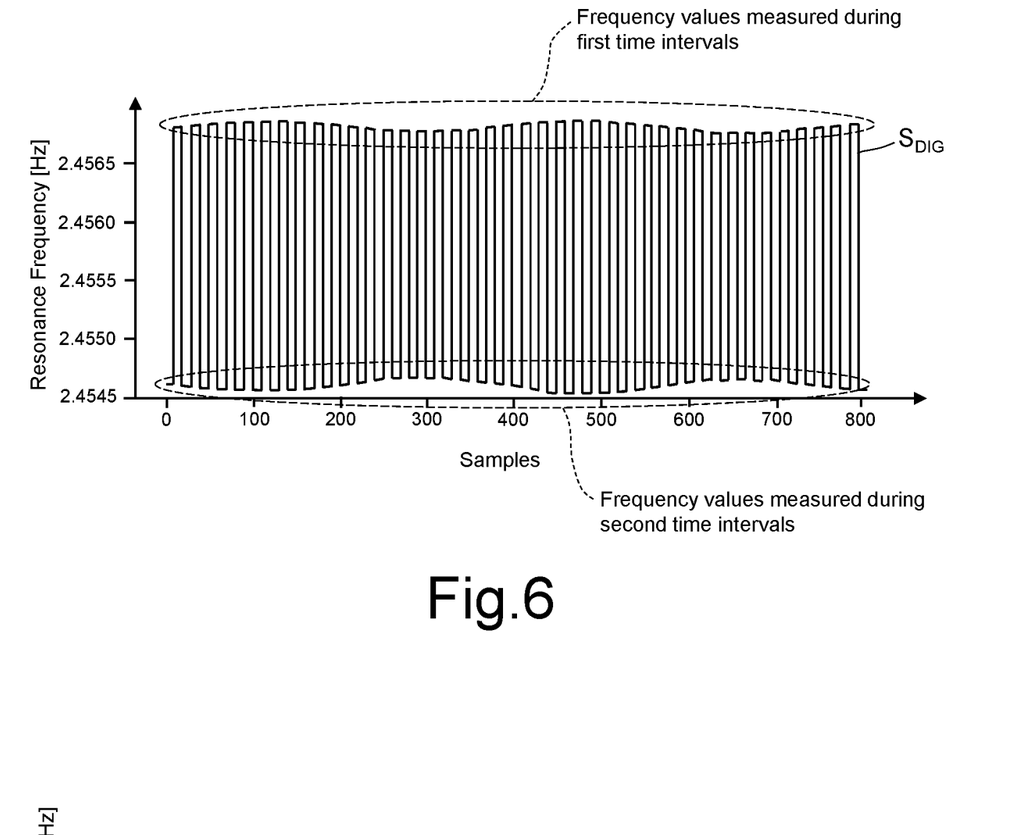
FIG. 6 shows an output signal representing an exemplary resonance frequency variation of the resonant sensor of FIG. 1A in the digital domain.

To this end, a frequency-to-digital converter 59 is coupled to node 57 and is configured to generate an output signal $S_{DIG}$, which is exemplarily shown in FIG. 6.

The signal $S_{DIG}$ shows an exemplary variation of oscillating frequency values of the resonator 1 in each first and second time interval as defined by the square wave signal generated by the blocks 49 and 51 of FIG. 5.

Figure 7:
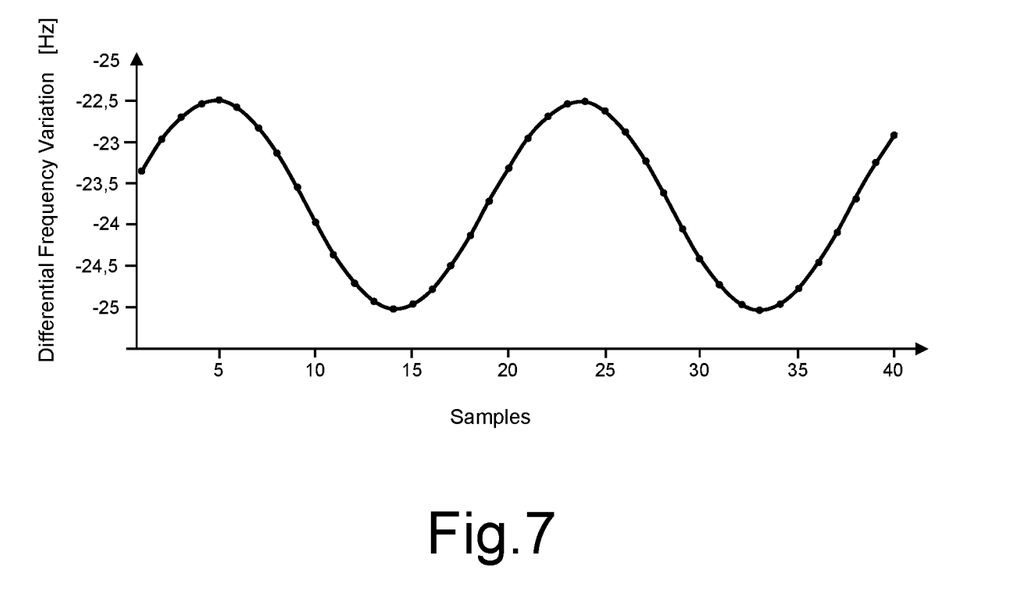
FIG. 7 shows a differential signal computed based on the output signal of FIG. 6.

FIG. 7 shows the differential frequency variation signal OutDiff, calculated by subtractor block 61 of FIG. 5, by subtracting the frequencies obtained during each second time interval to the frequencies obtained during each, immediately preceding or immediately following, first time interval. It is apparent that the subtraction operation may be carried out between a medium value of a plurality of resonance frequencies acquired during a respective plurality of first tuning time intervals and a medium value of a plurality of resonance frequencies acquired during a respective plurality of second tuning time intervals.

The differential frequency variation signal OutDiff can be correlated to the external acceleration through the following procedure.

With reference to FIG. 5, it is noted that the frequency of the oscillator output at node 57 is equal to the frequency of the anti-phase vibration modes. By measuring the frequency of this signal in the two tuning interval, one can obtain ($f_1$ and $f_2$ being the frequencies measured in the first and second tuning interval):

$$f_{out1} = f_0 + \Delta f(a)$$

$$f_{out2} = f_0 - \Delta f(a)$$

where $f_0$ is the resonance frequency at rest of the single resonator 1. By computing the difference:

$$f_{out,diff} = f_{out2} - f_{out1} = 2\Delta f(a),$$

and by dividing the equation of $f_{diff}$ by the sensitivity given by equation (14), one can obtain the measure of external acceleration $a_{ext}$ as:

$$a_{ext} = \frac{f_{out,diff}}{S} \tag{19}$$

According to the above, one obtains a signal which is, at first order, insensitive to temperature variation of the resonance frequency, thus solving the issue discussed above with reference to the known art.

As a non-limitative example, it is now provided a possible dimensioning of the resonator of FIG. 1A. The resonator 1 can be designed in such a way to occupy a total area (on XY plane) of about 500×500 μm². In such embodiments, the tuning electrodes 22-25 may have a length $L_{tun}$, measured along Y-axis, of about 400 μm.

The polarization voltage of each tuning electrode 22-25 can be switched between the rotor polarization $V_{DC}$ (e.g., 10 V supplied by a charge pump) and the integrated electronics supply voltage (e.g., about 3V): in this example, voltage difference $V_{tun}$ is about 7V. In some embodiments, the voltage difference $V_{tun}$ is within a range from 3V to 15V, inclusive. Due to sensitivity specifications, the gap $g_{tun}$ is, as already said, about 2 μm (or even less, e.g., between 1 μm and 1.8 μm, if the manufacturing technology is not a limiting factor). Knowing that, when packaged, the resonator 1 would be subject to a package internal pressure of about 0.7 mbar, it is possible to compute the value of the damping coefficient b, which is about 4.4 μNs/m. The Applicant verified that an oscillating frequency $f_{aph}$ around 25 kHz allows to drive the first and second resonating structures 2, 4 in antiphase mode and to obtain a good sensitivity. With a mass m1=m2=m≈3 nkg, the Applicant verified that the quality factor obtained for the anti-phase mode is around 1000.

For the dimensioning of drive electrodes, the Applicant verified that, for each driving electrode, a number of drive comb fingers $N_{cf,D}$ of about 7-10, e.g., equal to 8, is enough to sustain the desired oscillation. For what concern the sense electrodes, a number $N_{cf,S}$ of about 50-60 allows to inject a desired amount of current in the front-end electronics (sensing circuit) to obtain a good signal to noise ratio.

With a fixed anti-phase displacement along X axis of 450 nm, and choosing the minimum gap $g_{cf}$ between driving fingers of about 1.8 μm, the amplitude of the sense current, flowing from one of the two sense electrodes, can be calculated as:

$$i_s = \eta_s \cdot (2\pi f_0) \cdot x_{aph} = (V_{DC} - V_S) \cdot \left(\frac{2\epsilon_0 H N_{cf,S}}{g_{cf}}\right)(2\pi f_0) \cdot x_{aph} \sim 10 \text{ nA} \quad (20)$$

Based on equation (17), it can be concluded that (having in the presented embodiment two sense electrodes) a 20 nA current flows, during use, into each feedback path of the fully differential transimpedance amplifier 40 shown in FIG. 4.

The above discussed embodiments and principles may be adapted to applications where sensing of out-of-plane acceleration is desired (i.e., acceleration components along the Z axis). See FIG. 8A for a schematic example of an inertial sensor adapted to sense out-of-plane accelerations.

Figures 8A, 8B:
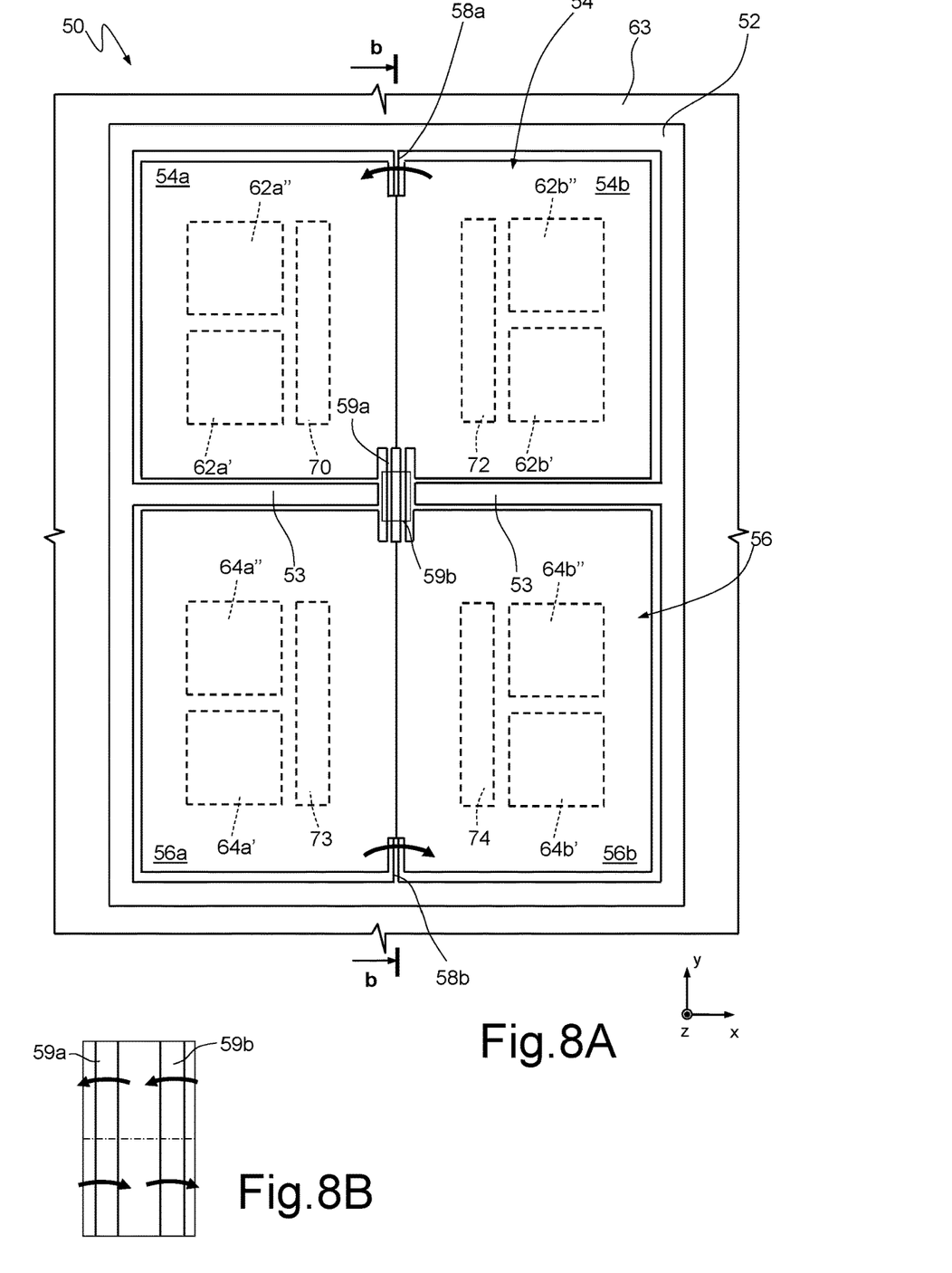
FIG. 8A shows a resonator configured to sense out-of-plane acceleration, according to a further embodiment of the present disclosure.
FIG. 8B is an enlarged view of the squared portion, with dashed line, of FIG. 8A.

According to FIG. 8A, an inertial sensor of resonating type 50 is shown, according to an aspect of the present disclosure. In the following it will be referred to as resonator 50. The resonator 50 of FIG. 8A comprises a rigid frame 52 (connected to a substrate 63 via clamps 53) and torsional resonating elements 54, 56 attached to the rigid frame 52 through torsional springs 58a, 58b and coupled to one another through further torsional springs 59a, 59b. Each torsional resonating elements 54, 56 includes two torsional sub-elements 54a, 54b and 56a, 56b which are kept in oscillation along Z axis by driving electrodes 62a', 62b' and respectively 64a', 64b' located on the substrate 63, and whose oscillation is sensed by sensing electrodes 62a'', 62b'' and respectively 64a'', 64b'' located on the substrate 63. The torsional resonating elements 54, 56 oscillates around an axis b-b when an external acceleration $a_z$ (directed along Z axis) occurs. Due to their oscillation, the torsional sub-elements approach the tuning electrodes 70-74 below them. Following the same conceptual scheme of the resonator 1, also the resonator 50 is characterized by at least two vibration modes: one in-phase mode and one anti-phase mode of vibration. More in particular, with reference to FIG. 9, when the torsional sub-elements 54a, 54b of a same torsional resonating element 54 are driven in anti-phase oscillation, one torsional sub-element, here 54b, moves towards the positive direction of the Z axis, while the other torsional sub-element 54a moves towards the negative direction of the Z axis. Analogously, when the torsional sub-elements 56a, 56b of a same torsional resonating element 56 are driven in anti-phase oscillation, one torsional sub-element, here 56a, moves towards the positive direction of the Z axis while the other torsional sub-element 56b towards the negative direction of the Z axis.

FIG. 8B is an enlarged view of the circled portion, with dashed line, of FIG. 8A. Here, the arrows show the sense of rotation of the torsional spring 59a connecting torsional sub-element 54a with torsional sub-element 56a, and of the torsional spring 59b connecting torsional sub-element 54b with torsional sub-element 56b, in order to implement the above described anti-phase oscillation.

Figure 9:
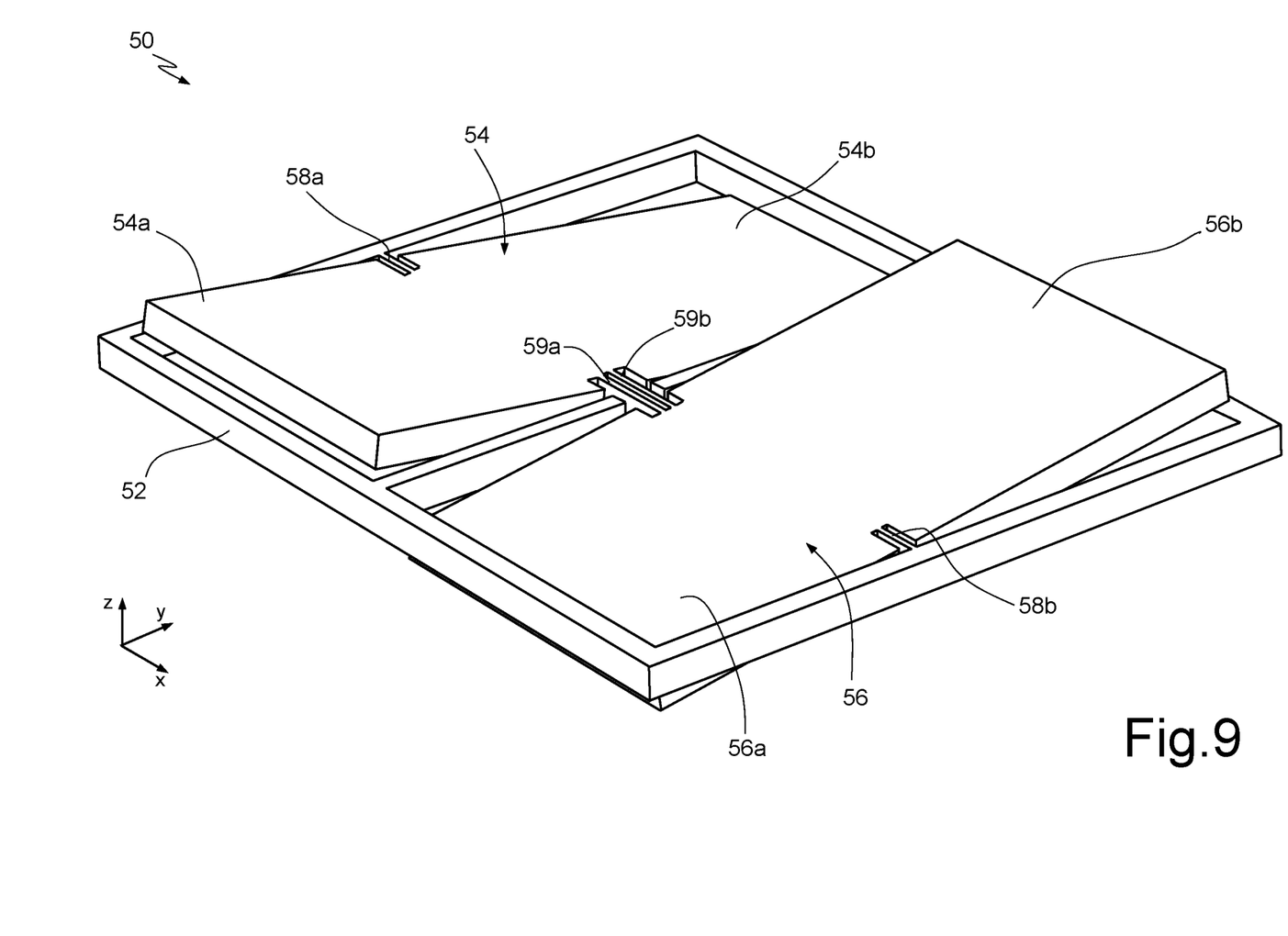
FIG. 9 is a prospective view of the resonator of FIG. 8A, during use.

FIG. 9 is a prospective view of the resonator 50 of FIG. 8A with torsional sub-elements driven in an anti-phase mode of oscillation. The functioning principle is analogous to that disclosed with reference to FIGS. 1A-7 and therefore is not further detailed. Also in this case, differential readout, in two different time intervals, is possible. By providing tuning electrodes 70-74 on the substrate 63 (e.g., next to the driving electrodes 62a-62b, 64a, 64b) and biasing the tuning electrodes 70-74 according to the same time-division scheme as discussed for the resonator 1 of FIGS. 1A-7, an oscillation frequency variation is generated as a function of the gap between the torsional sub-elements 54a, 54b, 56a, 56b and the respective tuning electrode 70-74 they are facing. The differential frequency variation is related to the external acceleration $a_z$ along the Z axis.

Figure 10:
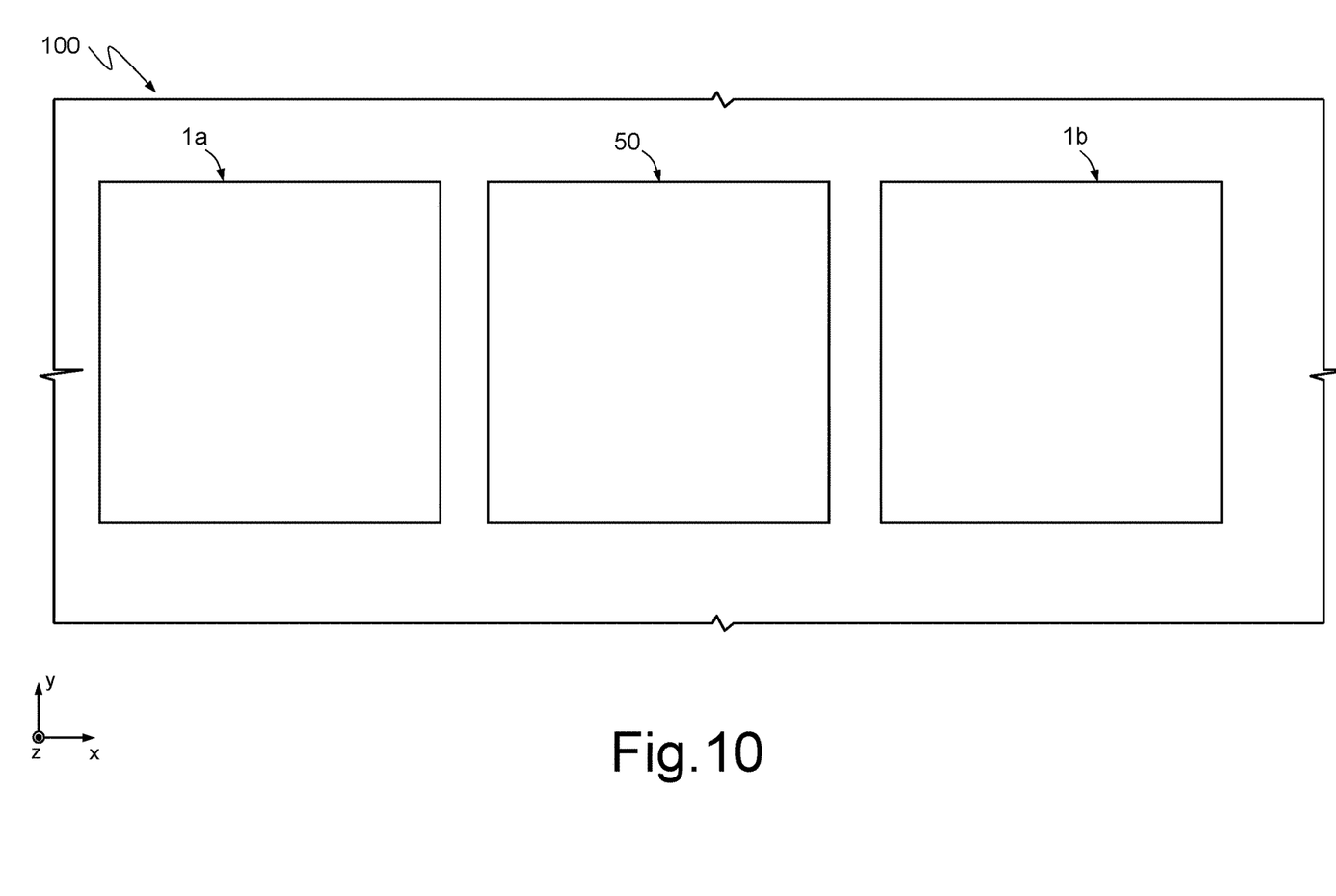
FIG. 10 shows a MEMS device implementing a 3-axis detection.

In the embodiment shown in FIG. 10, a MEMS device 100 implements a triaxial detection, in particular a detection of respective components of acceleration acting along the first and second horizontal axes X, Y and along the vertical axis Z.

For this purpose, the MEMS device 100 comprises three distinct micromechanical structures (resonators), each of a uniaxial type, and in particular: a first resonator for detection of a component of acceleration directed along the Y axis; a second resonator 1b for detection of a component of acceleration directed along the X axis; and a third micromechanical structure 50 for detection of a component of acceleration directed along the vertical Z axis. Each of the first and the second resonators 1a, 1b structurally and functionally corresponds to the resonator 1 disclosed above and are simply oriented in such a way that the respective sensitive axis (axis of oscillation) be along the X axis (resonator 1a) or the Y axis (resonator 1b).

The advantages of the disclosure described previously, according to the various embodiments, emerge clearly from the foregoing description.

In particular, the present disclosure avoids the use of two separate resonator, with different tuning plates disposition, to implement a differential sensing as in the prior art. In this case, the use of a single, time-switched, resonator guarantees good rejection of frequency drifts due to the temperature coefficient of the Young's modulus.

The disclosed disclosure can be applied both to in-plane and out-of-plane devices, and thus guarantees the feasibility of a 3-axis structure.

Finally, it is clear that modifications and variations may be made to what has been described and illustrated herein, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An inertial sensor, comprising:
    a first proof mass configured to oscillate along a sensing axis;
    a first tuning electrode and a second tuning electrode;
    first and second capacitors, the first capacitor including the first tuning electrode and the first proof mass, the second capacitor including the second tuning electrode and the first proof mass, the first and second capacitors having respective capacitances which undergo opposite variations in response to the oscillation of the first proof mass along the sensing axis;
    a second proof mass configured to oscillate along the sensing axis;
    a third tuning electrode and a fourth tuning electrode;
    third and fourth capacitors, the third capacitor including the third tuning electrode and the second proof mass, the fourth capacitor including the fourth tuning electrode and the second proof mass, the third and fourth capacitors having respective capacitances which undergo opposite variations in response to the oscillation of the second proof mass along the sensing axis;
a driving assembly coupled to the first and second proof masses, the driving assembly being configured to cause an anti-phase oscillation of the first and second proof mass at a resonance frequency along the sensing axis;
a biasing circuit configured to bias, in a first time interval, the first tuning electrode and the third tuning electrode to generate a first electrostatic field which causes a first variation of said resonance frequency, and configured to bias, in a second time interval, the second tuning electrode and the fourth tuning electrode to generate a second electrostatic field which causes a second variation of said resonance frequency; and
a sensing assembly configured to generate an output signal which is a function of a difference between a value of the resonance frequency during the first time interval and a value of the resonance frequency during the second time interval.

2. The inertial sensor of claim 1, wherein the inertial sensor is an accelerometer configured to sense an external acceleration acting along the sensing axis, the output signal generated by the sensing assembly having a frequency which is a function of said external acceleration.

3. The inertial sensor of claim 2, wherein the output signal generated by the sensing assembly is a voltage signal proportional to said external acceleration.

4. The inertial sensor of claim 2, wherein each of a plurality of first time intervals are alternately arranged between respective ones of a plurality of second time intervals at a frequency which is higher than a frequency of the external acceleration to be sensed.

5. The inertial sensor according to claim 2, wherein the first capacitor has a first gap between facing portions of the first tuning electrode and the first proof mass, the second capacitor has a second gap between facing portions of the second tuning electrode and the first proof mass, the third capacitor has a third gap between facing portions of the third tuning electrode and the second proof mass, and the fourth capacitor has a fourth gap between facing portions of the fourth tuning electrode and the second proof mass,
and wherein, in an absence of the external acceleration and anti-phase oscillation of the first and second proof mass, the first, second, third and fourth gaps are substantially equal to one another.

6. The inertial sensor according to claim 2, wherein the first capacitor has a first gap between facing portions of the first tuning electrode and the first proof mass, the second capacitor has a second gap between facing portions of the second tuning electrode and the first proof mass, the third capacitor has a third gap between facing portions of the third tuning electrode and the second proof mass, and the fourth capacitor has a fourth gap between facing portions of the fourth tuning electrode and the second proof mass,
and wherein, during the anti-phase oscillation of the first and second proof masses and in an absence of the external acceleration, the first and the third gaps are substantially equal to one another and different from the second and fourth gaps, and the second and the fourth gaps are substantially equal to one another and different from the first and third gaps.

7. The inertial sensor of claim 1, wherein the sensing assembly comprises:
first sensing electrodes capacitively coupled to the first proof mass;
second sensing electrodes capacitively coupled to the second proof mass;
a capacitance-to-voltage converter configured to:
measure, during the first time interval, a first signal which is proportional to a variation of capacitance between the first sensing electrodes and the first proof mass;
measure, during the second time interval, a second signal which is proportional to a variation of capacitance between the second sensing electrodes and the second proof mass;
generate a first intermediate output signal which is indicative of a first value of the anti-phase resonance frequency during the first time interval; and
generate a second intermediate output signal which is indicative of a second value of the anti-phase resonance frequency during the second time interval; and
a subtractor configured to generate the output signal by performing a subtract operation between the first and second resonance frequency values.

8. The inertial sensor of claim 7, wherein the sensing assembly is further configured to correlate said output signal to a value of said external acceleration.

9. The inertial sensor of claim 1, wherein the first time interval immediately precedes or immediately follows the second time interval.

10. The inertial sensor of claim 1, wherein the first, second, third and fourth tuning electrodes are spatially arranged with respect to the first and second proof masses such that, when the capacitance of the first capacitor increases in response to the oscillation of the first proof mass along the sensing axis, the capacitance of the second capacitor decreases, and when the capacitance of the third capacitor increases in response to the oscillation of the second proof mass along the sensing axis, the capacitance of the fourth capacitor decreases.

11. The inertial sensor of claim 1, wherein the first, second, third and fourth capacitors are parallel plate capacitors.

12. The inertial sensor of claim 1, wherein the biasing circuit is configured to:
generate, in the first time interval, a same voltage difference between the first tuning electrode and the first proof mass and between the third tuning electrode and the second proof mass; and
generate, in the second time interval, said voltage difference between the second tuning electrode and the first proof mass and between the fourth tuning electrode and the second proof mass.

13. The inertial sensor of claim 12, wherein said voltage difference is within a range between 3 V and 15 V, inclusive.

14. The inertial sensor of claim 12, wherein the biasing circuit is further configured to:
bias, during the first time interval, the first proof mass, the second proof mass, the second tuning electrode, and the fourth tuning electrode at a same fixed voltage; and
bias, during the second time interval, the first proof mass, the second proof mass, the first tuning electrode, and the third tuning electrode at said fixed voltage.

15. The inertial sensor of claim 1, further comprising a substrate, the first and the second proof masses being suspended over, and mobile with respect to, said substrate, the first, second, third and fourth tuning electrodes being fixed with respect to said substrate.

16. The inertial sensor of claim 15, wherein said sensing axis is parallel to a surface of the substrate.

17. The inertial sensor of claim 15, wherein said sensing axis is transverse to a surface of the substrate.

18. A MEMS device, comprising:
a substrate;
first, second, and third inertial sensors, each of the first, second, and third sensors including:
- a first proof mass configured to oscillate along a sensing axis;
- a first tuning electrode and a second tuning electrode;
- first and second capacitors, the first capacitor including the first tuning electrode and the first proof mass, the second capacitor including the second tuning electrode and the first proof mass, the first and second capacitors having respective capacitances which undergo opposite variations in response to the oscillation of the first proof mass along the sensing axis;
- a second proof mass configured to oscillate along the sensing axis;
- a third tuning electrode and a fourth tuning electrode;
- third and fourth capacitors, the third capacitor including the third tuning electrode and the second proof mass, the fourth capacitor including the fourth tuning electrode and the second proof mass, the third and fourth capacitors having respective capacitances which undergo opposite variations in response to the oscillation of the second proof mass along the sensing axis;
- a driving assembly coupled to the first and second proof masses, the driving assembly being configured to cause an anti-phase oscillation of the first and second proof mass at a resonance frequency along the sensing axis;
- a biasing circuit configured to bias, in a first time interval, the first tuning electrode and the third tuning electrode to generate a first electrostatic field which causes a first variation of said resonance frequency, and configured to bias, in a second time interval, the second tuning electrode and the fourth tuning electrode to generate a second electrostatic field which causes a second variation of said resonance frequency; and
- a sensing assembly configured to generate an output signal which is a function of a difference between a value of the resonance frequency during the first time interval and a value of the resonance frequency during the second time interval.

19. The MEMS device of claim 18 wherein the first and the second proof masses of each of the first, second, and third inertial sensors are suspended over, and mobile with respect to, said substrate, and the first, second, third, and fourth tuning electrodes of each of the first, second, and third inertial sensors are fixed with respect to said substrate.

20. The MEMS device of claim 19 wherein the sensing axis of the first inertial sensor is a first axis parallel to a surface of the substrate, the sensing axis of the second inertial sensor is a second axis parallel to the surface of the substrate, and the sensing axis of the third inertial sensor is a third axis transverse to the surface of the substrate, the first, second, and third axes being orthogonal with respect to one another.

21. A method, comprising:
oppositely varying a first capacitance and a second capacitance by oscillating a first proof mass at a resonance frequency along a sensing axis, the first capacitance being a capacitance of a first capacitor formed by a first tuning electrode and the first proof mass, the second capacitance being a capacitance of a second capacitor formed by a second tuning electrode and the first proof mass;
oppositely varying a third capacitance and a fourth capacitance by oscillating a second proof mass at said resonance frequency along the sensing axis, the third capacitance being a capacitance of a third capacitor formed by the third tuning electrode and the second proof mass, the fourth capacitance being a capacitance of a fourth capacitor formed by the fourth tuning electrode and the second proof mass, the first proof mass and the second proof mass being oscillated in anti-phase;
biasing, in a first time interval, the first tuning electrode and the third tuning electrode to generate an electrostatic field which causes a first variation of said resonance frequency;
biasing, in a second time interval, the second tuning electrode and the fourth tuning electrode to generate an electrostatic field which causes a second variation of said resonance frequency; and
generating an output signal which is a function of a difference between a value of the resonance frequency during the first time interval and a value of the resonance frequency during the second time interval.

22. The method of claim 21, wherein the inertial sensor is an accelerometer, and wherein operating the inertial sensor includes sensing an external acceleration acting along the sensing axis,
the frequency of the output signal generated being a function of said external acceleration.

23. The method of claim 22, wherein the output signal generated is a voltage signal proportional to said external acceleration.

24. The method of claim 21, wherein the oscillating the first proof mass and the oscillating the second proof mass are performed contemporaneously.

* * * * *